US011366816B2

(12) United States Patent
Getson et al.

(10) Patent No.: US 11,366,816 B2
(45) Date of Patent: Jun. 21, 2022

(54) SECURE INTELLIGENT NETWORKED SYSTEMS

(71) Applicant: Capitalogix IP Owner, LLC, Coppell, TX (US)

(72) Inventors: Howard M. Getson, Coppell, TX (US);
Ben Getson, Washington, DC (US);
Sean Vallie, Lewisville, TX (US); Ryan Echternacht, Addison, TX (US)

(73) Assignee: Capitalogix IP Owner, LLC, Coppell, TX (US)

( * ) Notice: Subject to any disclaimer, the term of this patent is extended or adjusted under 35 U.S.C. 154(b) by 240 days.

(21) Appl. No.: 14/642,569

(22) Filed: Mar. 9, 2015

(65) Prior Publication Data

US 2015/0254765 A1 Sep. 10, 2015

Related U.S. Application Data

(60) Provisional application No. 61/949,938, filed on Mar. 7, 2014.

(51) Int. Cl.
*G06F 16/24* (2019.01)
*G06F 16/2457* (2019.01)
(Continued)

(52) U.S. Cl.
CPC ......... *G06F 16/24578* (2019.01); *G06N 3/02* (2013.01); *G06Q 40/00* (2013.01); *G06Q 40/04* (2013.01); *G06N 5/04* (2013.01)

(58) Field of Classification Search
CPC ...... G06Q 40/00; G06Q 40/025; G06Q 40/04; G06Q 40/06; G06Q 30/08
(Continued)

(56) References Cited

U.S. PATENT DOCUMENTS

| 5,761,442 A | 6/1998 | Barr et al. |
| 6,578,068 B1 | 6/2003 | Bowman-Amuah |

(Continued)

FOREIGN PATENT DOCUMENTS

| CN | 101276454 A | 10/2008 |
| CN | 102136099 A | 7/2011 |

(Continued)

OTHER PUBLICATIONS

Murray A. Ruggiero, Trading on the cutting edge, Apr. 14, 2014, Alpha Pages, Magazines/FUTURES—Technology & Trading, Copyright Alpha Pages Apr. 2014, 5 pages. (Year: 2014).*

(Continued)

*Primary Examiner* — Benjamin S Brindley
(74) *Attorney, Agent, or Firm* — Carr & Ferrell LLP

(57) ABSTRACT

Provided herein are various exemplary systems and methods for secure intelligent networked systems including a random combination generator, a master cloud server communicatively coupled to the random combination generator, the master cloud server having an interactive graphical user interface configured to receive user commands for generating a plurality of virtual machines, the master cloud server automatically identifying an idle virtual machine in the plurality of virtual machines and automatically utilizing the idle virtual machine, and a selected strategy server communicatively couple to the master cloud server, the master cloud server automatically generating decoy first digital data elements interspersed with selected first digital data elements and automatically transmitting the selected first digital data elements interspersed with the decoy first digital data elements to the selected strategy server.

20 Claims, 7 Drawing Sheets

(51) Int. Cl.
  *G06Q 40/04* (2012.01)
  *G06N 3/02* (2006.01)
  *G06Q 40/00* (2012.01)
  *G06N 5/04* (2006.01)
(58) Field of Classification Search
  USPC .......................................................... 705/37
  See application file for complete search history.

(56) References Cited

U.S. PATENT DOCUMENTS

| | | | |
|---|---|---|---|
| 6,735,580 B1 | 5/2004 | Li et al. | |
| 7,644,863 B2 | 1/2010 | Chen et al. | |
| 7,805,344 B2 | 9/2010 | Smith | |
| 7,882,014 B2* | 2/2011 | Shapiro | G06Q 40/04 705/37 |
| 7,908,203 B2* | 3/2011 | Shapiro | G06Q 40/025 705/37 |
| 8,250,102 B2 | 8/2012 | Madhavarapu et al. | |
| 8,285,658 B1 | 10/2012 | Kellas-Dicks et al. | |
| 8,442,885 B1* | 5/2013 | Carrie | G06Q 40/04 705/35 |
| 8,626,522 B2 | 1/2014 | Greenwood | |
| 9,529,634 B1 | 12/2016 | Hsu et al. | |
| 9,626,503 B2* | 4/2017 | Jung | G06F 21/44 |
| 9,934,000 B2 | 4/2018 | Sherwood et al. | |
| 10,387,679 B2 | 8/2019 | Getson et al. | |
| 10,423,800 B2 | 9/2019 | Getson et al. | |
| 10,795,893 B2 | 10/2020 | Getson et al. | |
| 10,824,753 B2 | 11/2020 | Getson et al. | |
| 2002/0095400 A1 | 7/2002 | Johnson et al. | |
| 2003/0046159 A1 | 3/2003 | Ebrahimi et al. | |
| 2003/0217129 A1 | 11/2003 | Knittel et al. | |
| 2004/0205110 A1 | 10/2004 | Hinshaw | |
| 2005/0203892 A1 | 9/2005 | Wesley et al. | |
| 2006/0101062 A1 | 5/2006 | Godman et al. | |
| 2007/0288466 A1 | 12/2007 | Bohannon et al. | |
| 2009/0012760 A1 | 1/2009 | Schunemann | |
| 2009/0089202 A1* | 4/2009 | Rowley | G06Q 40/04 705/37 |
| 2009/0125370 A1 | 5/2009 | Blondeau et al. | |
| 2011/0153445 A1 | 6/2011 | Huang et al. | |
| 2011/0185063 A1 | 7/2011 | Head et al. | |
| 2011/0238555 A1* | 9/2011 | Rosenthal | G06Q 40/04 705/37 |
| 2011/0246298 A1 | 10/2011 | Williams et al. | |
| 2012/0023035 A1* | 1/2012 | Kuhnle | G06Q 40/04 705/36 R |
| 2012/0257820 A1 | 10/2012 | Sanghvi et al. | |
| 2012/0259762 A1* | 10/2012 | Tarighat | G06F 3/0486 705/37 |
| 2012/0271658 A1* | 10/2012 | Sloan, III | G06Q 10/10 705/4 |
| 2012/0324446 A1 | 12/2012 | Fries et al. | |
| 2013/0024395 A1* | 1/2013 | Clark | G06Q 40/06 705/36 R |
| 2013/0138577 A1* | 5/2013 | Sisk | G06Q 40/06 705/36 R |
| 2013/0159161 A1* | 6/2013 | Soubolsky | G06Q 40/04 705/37 |
| 2013/0211990 A1 | 8/2013 | Zhong | |
| 2013/0325918 A1 | 12/2013 | Sherwood et al. | |
| 2014/0052421 A1 | 2/2014 | Allen et al. | |
| 2014/0122480 A1* | 5/2014 | Jung | G06F 21/60 707/736 |
| 2014/0215033 A1 | 7/2014 | Ravichandran et al. | |
| 2014/0297495 A1* | 10/2014 | Dalal | G06Q 40/06 705/37 |
| 2015/0127628 A1 | 5/2015 | Rathod | |
| 2015/0254556 A1 | 9/2015 | Getson et al. | |
| 2015/0302303 A1 | 10/2015 | Hakim | |
| 2016/0021157 A1 | 1/2016 | Duerring | |
| 2016/0335532 A1 | 11/2016 | Sanghavi et al. | |
| 2017/0018034 A1 | 1/2017 | Wainman et al. | |
| 2017/0180272 A1 | 6/2017 | Bernath | |
| 2018/0004969 A1 | 1/2018 | Getson et al. | |
| 2018/0196964 A1 | 7/2018 | Getson et al. | |
| 2019/0340380 A1 | 11/2019 | Getson et al. | |
| 2019/0354722 A1 | 11/2019 | Getson et al. | |
| 2020/0201871 A1 | 6/2020 | Getson et al. | |
| 2021/0049293 A1 | 2/2021 | Getson et al. | |
| 2022/0027736 A1 | 1/2022 | Getson et al. | |

FOREIGN PATENT DOCUMENTS

| | | |
|---|---|---|
| CN | 102333126 A | 1/2012 |
| CN | 102393894 A | 3/2012 |
| CN | 102523166 A | 6/2012 |
| CN | 102663649 A | 9/2012 |
| CN | 102713849 A | 10/2012 |
| CN | 103412792 A | 11/2013 |
| CN | 103493008 A | 1/2014 |
| CN | 106462794 A | 2/2017 |
| CN | 106462795 A | 2/2017 |
| CN | 109804360 A | 5/2019 |
| CN | 110383245 A | 10/2019 |
| CN | 106462795 B | 5/2020 |
| CN | 111488975 A | 8/2020 |
| ID | 202000594 A | 3/2020 |
| SG | 11201607309 T | 9/2019 |
| SG | 11201607320 T | 10/2019 |
| WO | WO2013082119 A1 | 6/2013 |
| WO | WO2015134991 A1 | 9/2015 |
| WO | WO2015134992 A1 | 9/2015 |
| WO | WO2018005170 A1 | 1/2018 |
| WO | WO2018128998 A1 | 7/2018 |

OTHER PUBLICATIONS

"International Search Report" and "Written Opinion of the International Searching Authority," Patent Cooperation Treaty Application No. PCT/US2018/012111, dated Mar. 26, 2018, 8 pages.
"Office Action," Singapore Patent Application No. 11201607309T, dated Jun. 12, 2018, 5 pages.
"Office Action," Singapore Patent Application No. 11201607320T, dated Jun. 8, 2018, 4 pages.
"Office Action," Chinese Patent Application No. 201580012482.5, dated Jun. 21, 2018, 7 pages (16 pages including translation).
Cui et al., "A nerve net invading detect model research based on inerratic detect by virtual machine running," Computer Science and Technique Department of Yunnan Police Officer Academy, Yunnan Kunming, 650223, China, Jun. 30, 2007, pp. 109-112.
"Office Action," Chinese Patent Application No. 201580012465.1, dated Jun. 21, 2018, 3 pages [5 pages including translation].
Rohit et al., "Large Data and Computation in a Hazard Map Workflow Using Hadoop and Neteeza Architectures," ACM, Nov. 18, 2013, pp. 7-12.
"Office Action," Chinese Patent Application No. 201580012482.5, dated Jan. 31, 2019, 4 pages (9 pages including translation).
"Office Action," Chinese Patent Application No. 201580012465.1, dated Feb. 1, 2019, 6 pages (12 pages including translation).
Orrantia, Jorge, "DMForex: A Data Mining Application to Predict Currency Exchange Rates and Trends," California State University Northridge Masters Thesis, 2012, pp. 1-67.
"Notice of Allowance" Singapore Patent Application No. 11201607309T, dated May 8, 2019, 6 pages.
"Notice of Allowance" Singapore Patent Application No. 11201607320T, dated May 15, 2019, 5 pages.
"Office Action," Chinese Patent Application No. 201580012465.1, dated Aug. 19, 2019, 6 pages (14 pages including translation).
"Office Action," Indonesian Patent Application No. P00201606735, dated Aug. 19, 2019, 2 pages (4 pages including translation).
"Office Action," Indonesian Patent Application No. P00201606736, dated Aug. 15, 2019, 2 pages (4 pages including translation).
"Office Action," Chinese Patent Application No. 201580012482.5, dated Sep. 2, 2019, 5 pages.
"International Search Report" and "Written Opinion of the International Searching Authority," Patent Cooperation Treaty Application No. PCT/US2015/019509, dated Jun. 24, 2015, 12 pages.

(56) References Cited

OTHER PUBLICATIONS

"International Search Report" and "Written Opinion of the International Searching Authority," Patent Cooperation Treaty Application No. PCT/US2015/019514, dated Jun. 19, 2015, 10 pages.
"Notice of Allowance" Chinese Patent Application No. 201580012482.5, dated Feb. 3, 2020, 4 pages (6 pages including translation).
"Office Action," Singapore Patent Application No. 11201811518U, dated Mar. 24, 2020, 6 pages.
"Office Action," Chinese Patent Application No. 201580012465.1, dated Apr. 23, 2020, 6 pages.
"Office Action," Singapore Patent Application No. 11201906224R, dated Aug. 20, 2020, 5 pages.
"Office Action," Chinese Patent Application No. 201580012465.1, dated Nov. 5, 2020, 10 pages (18 pages including translation).
Liu, Jiyuan, "Natural Disasters and Spatial Information System", Sep. 30, 2013, 33 pages.
"Office Action", Singapore Patent Application No. 10201906293Y, dated Feb. 9, 2021, 24 pages.
"Notice of Allowance" China Patent Application No. 201580012465.1, dated Mar. 26, 2021, 2 pages [4 pages with translation].
Pan et al., "An Intelligent Agent Framework for Enterprise Integration", IEEE Transactions on Syystems, Man, and Cybernetics, vol. 211, No. 6, 1991, pp. 1391-1408.
Ezzeddine et al., "An intelligent Framework for the Cooperation in the Extended Enterprise Environment", IEEE, 2011, pp. 379-384.
Podpora et al., "Intelligent Real-Time Adaptation for Power Efficiency in Sensor Networks", IEEE Sensors Journal, vol. 8, No. 12, Dec. 2008, pp. 2066-2073.
Merdan et al., "Intelligent-Agent based Approach for Assembly Automation", E Conference on Soft Computing in Industrial Applications, Jun. 2008, pp. 13-19.
Yan, "The Research of Active Data Warehouse Based on Multi-agent", IEEE, 2012, pp. 1-4.
Koskinen et al., "Exploring Algorithms for Automated FX Trading—Constructing a Hybrid Model," Seminar on Case Studies in Operations Research, Helsinki University of Technology, 2008, pp. 1-50.
Akhtar et al., Distributed Online Banking, retrieved from <http://www.micsymposium.org/mics_2004/Akhtar.pdf>, 2004, pp. 1-14.
"International Search Report and Written Opinion of the International Searching Authority," Patent Cooperation Treaty Application No. PCT/US2017/038375, dated Sep. 12, 2017, 7 pages.
"Office Action," Singapore Patent Application No. 11201607320T, dated Nov. 15, 2017, 8 pages.
"Office Action," Singapore Patent Application No. 11201607309T, dated Nov. 15, 2017, 8 pages.
Lo, Andrew W. et al., "Foundations of Technical Analysis: Computational Algorithms, Statistical Inference, and Empirical Implementation," The Journal of Finance, vol. 55 No. 4, Aug. 2000, pp. 1705-1765.
Percival, Scott, "Backtesting and Data Mining," trade2win.com [online], Dec. 23, 2007 [retrieved on Nov. 20, 2017], Retrieved from the Internet: <URL:https://web.archive.org/web/20130601132145/http://www.trade2win.com/articles/1258-backtesting-data-mining>, 8 pages.
"Notice of Allowance" Singaporean Patent Application No. 10201906293Y, dated Jan. 11, 2022, 5 pages.
"Notice of Allowance," Indonesian Patent Application No. P00201606736, dated Jan. 13, 2022, 2 pages (4 pages including translation).

* cited by examiner

US 11,366,816 B2

SECURE INTELLIGENT NETWORKED SYSTEMS

CROSS-REFERENCE TO RELATED APPLICATIONS

The present application claims the benefit and priority of U.S. Provisional Application Ser. No. 61/949,938 filed on Mar. 7, 2014, titled "Systems and Methods for Big Data Trading in Financial Markets," which is hereby incorporated by reference.

The present application is related to U.S. Non Provisional application Ser. No. 14/642,577 filed concurrently herewith, titled "Systems and Methods for Allocating Capital to Trading Strategies for Big Data Trading in Financial Markets," which is hereby incorporated by reference.

FIELD OF THE TECHNOLOGY

The embodiments disclosed herein are related to secure intelligent networked systems.

SUMMARY

Provided herein are various exemplary systems and methods for a secure intelligent networked system comprising a random combination generator; a master cloud server communicatively coupled to the random combination generator, the master cloud server having an interactive graphical user interface configured to receive user commands for generating a plurality of virtual machines, the master cloud server automatically identifying an idle virtual machine in the plurality of virtual machines and automatically utilizing the idle virtual machine; and a selected strategy server communicatively couple to the master cloud server, the master cloud server automatically generating decoy first digital data elements interspersed with selected first digital data elements and automatically transmitting the selected first digital data elements interspersed with the decoy first digital data elements to the selected strategy server.

DETAILED DESCRIPTION OF EXEMPLARY EMBODIMENTS

Figure 1A:
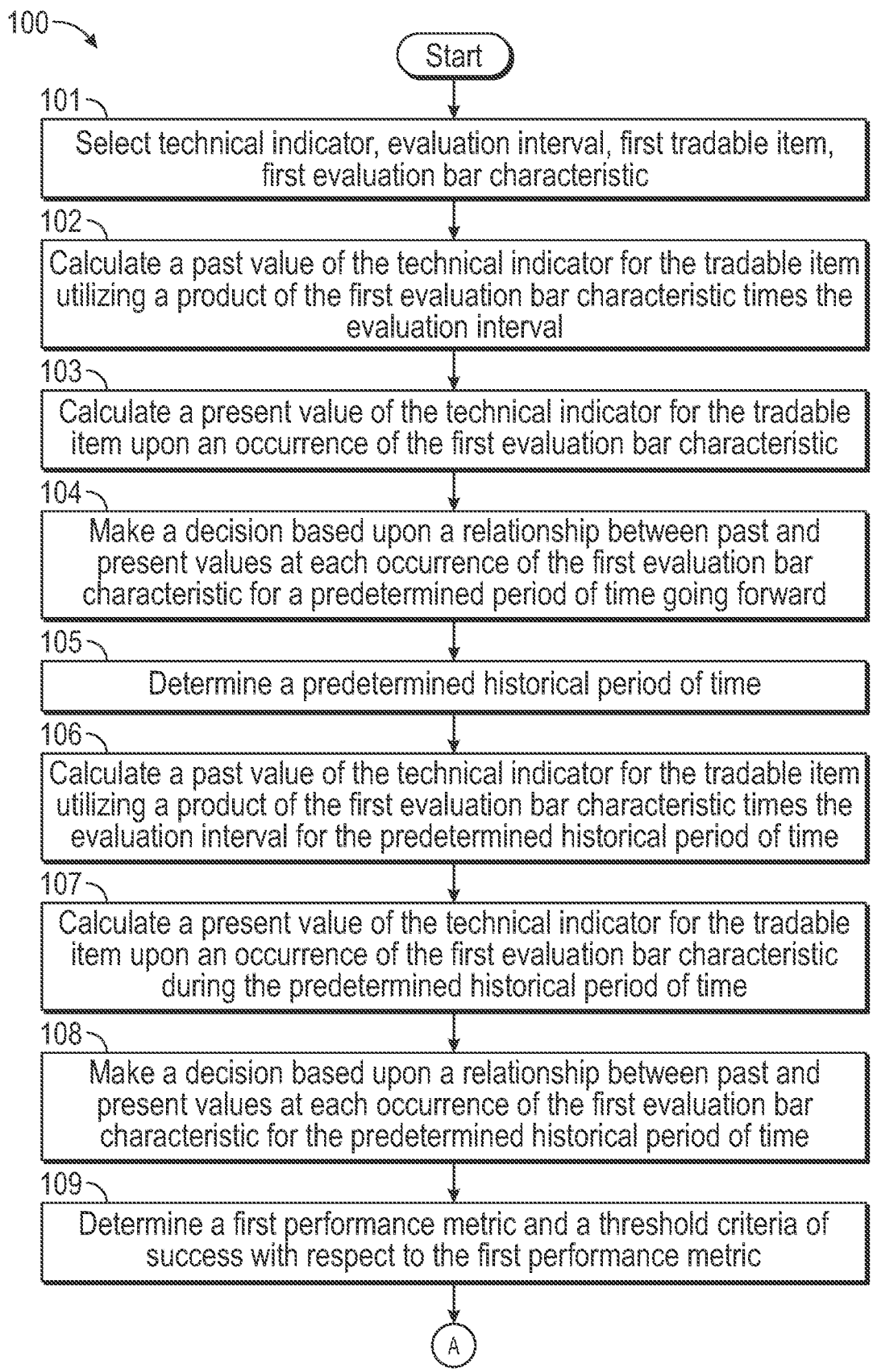
FIGS. 1A-1C are flowcharts of an exemplary method for a secure intelligent networked system.
Figure 1B:
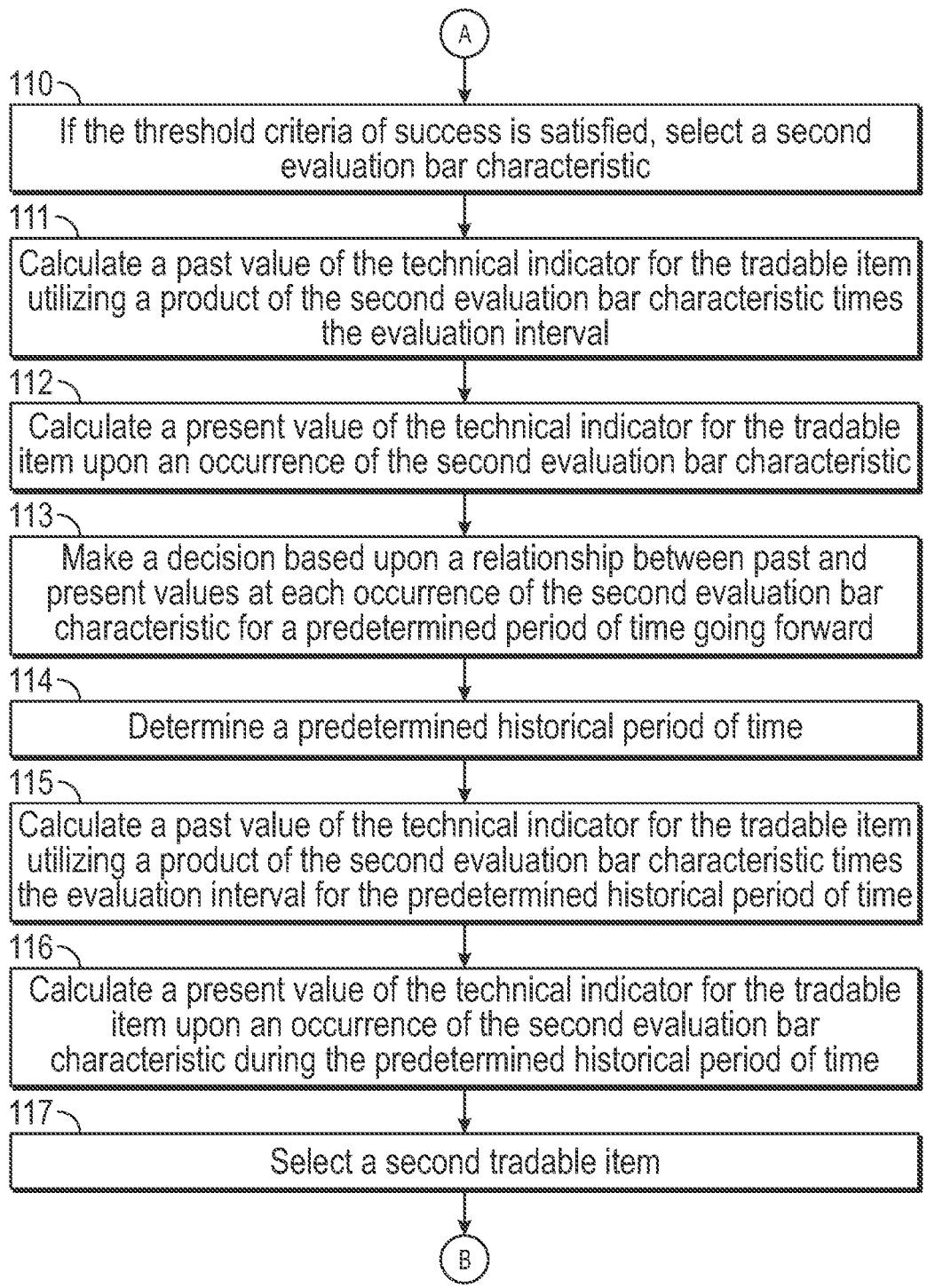
Figure 1C:
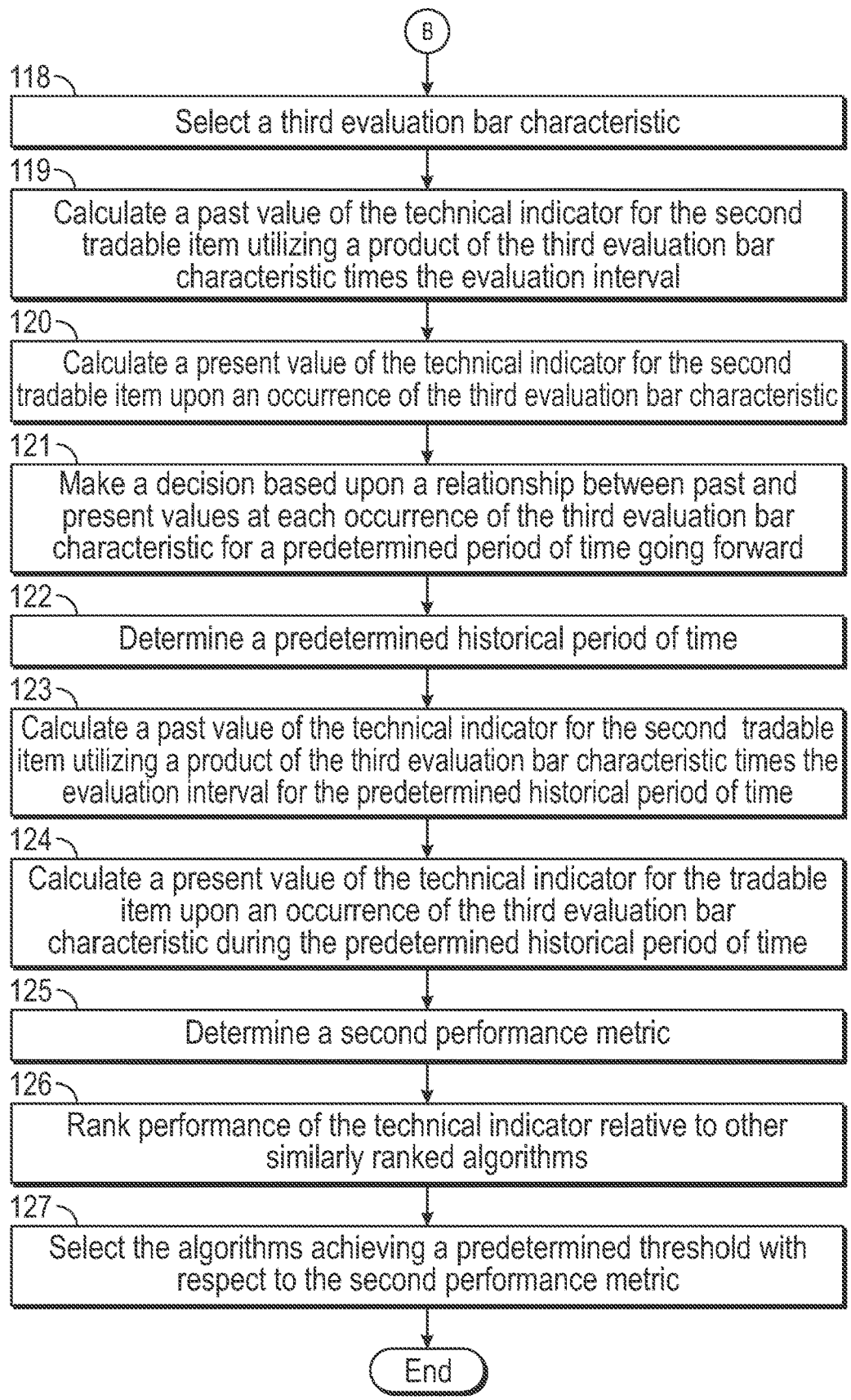

FIGS. 1A-1C are flowcharts of an exemplary method 100 for a secure intelligent networked system.

At step 101, a technical indicator, evaluation interval, first tradable item and first evaluation bar characteristic are selected. The methods of selection may vary from random selection of one or more of the above elements to the use of other models for making the selection. Selection methodologies may include, but are not limited to, human design, fuzzy logic, artificial neural networks, evolutionary algorithms, genetic algorithms, machine-learning, etc. In some instances, step 101 is a fully automated process.

A bar is comprised of an opening price, a closing price, intervening prices, volume and trading activity across a period of time for a tradable item. For example, the price of gold may open at $800 per ounce on an exchange at 9:00 AM and close at $900 per ounce on the same exchange at 5:00 PM. This may represent one bar.

A technical indicator at the most basic level is a series of data points that are derived by applying a formula to price data of a tradable item. Technical indicators provide a unique perspective on the strength and direction of the underlying price action of the tradable item. Exemplary technical indicators include, but not by way of limitation, Relative Strength Index ("RSI"), Average Directional Index, Stochastics, Money Flow Index, Moving Average Convergence-Divergence, Bollinger Bands®, etc.

An evaluation interval is the number of bars to evaluate if a condition is true. For example, with respect to RSI, if the evaluation interval is fifty-five bars, the method includes determining whether the RSI is true during the last fifty-five bars.

An evaluation bar characteristic may include a time period to evaluate if a condition is true. For instance, a 31 minute evaluation period may represent an evaluation bar characteristic. With respect to the RSI example (above), the method may include evaluating whether the Relative Strength Index is true over the previous fifty-five 31 minute evaluation bars.

Evaluation bar characteristics may be based on Time, Tick, Volume, or Market-Activity. For example, Time (e.g., second, minute, hour, day, month etc.), and/or Tick (trades at the exchange, e.g., X number of trades) and/or Volume (e.g., one, ten, two-hundred, one-thousand etc. contracts), and/or Market-Activity (e.g., 0.5%, 1%, 1.5%, 2% etc. market move).

Tradable items may include any item that is traded. For example, the futures market for Gold may be selected for generating trading algorithms. Tradable items may include any electronically traded market including: Futures (e.g., S&P, Euro, Gold, Crude, Cotton, Soybeans, 10-yr notes, Lean Hogs, etc.), Stocks (e.g., PG, GE, AAPL, GOOG, FB, etc.), Bonds (e.g., US Gov. Bonds, Eurodollar, etc.), and Forex (e.g., EURUSD euro to the dollar, etc.).

With respect to step 101, as an example, the Relative Strength Index ("RSI") may be selected as a technical indicator. 55 evaluation intervals may be selected. The price of gold may be selected as the first tradable item. Every 31 minutes may be selected as the first evaluation bar characteristic.

At step 102, a past value of the technical indicator for the tradable item is calculated utilizing a product of the first evaluation bar characteristic times the evaluation interval. For example, applying the data from step 101, a past value for the RSI for gold is calculated every 31 minutes for the past fifty-five 31 minute evaluation intervals (1,705 past values of the RSI are generated).

At step 103, a present value of the technical indicator for the tradable item is calculated upon an occurrence of the first evaluation bar characteristic. For example, applying the data from step 101, a present value for the RSI is calculated every 31 minutes going forward.

At step 104, a decision is made based upon a relationship between the past and present values of the technical indicator at each occurrence of the first evaluation bar characteristic for a predetermined period of time going forward. For example, applying the data from step 101, for a predetermined period of time going forward of the next three days, every 31 minutes, a present value of the RSI for gold is calculated. This value will be compared to the past value of the RSI for gold calculated 31 minutes prior to the present value calculation. If the relationship of the present value is higher, lower, or has not changed relative to the past value, a corresponding trading decision such as buy, sell, or hold is made.

At step 105, a predetermined historical period of time is determined. For example, the last five years can be a predetermined historical period of time.

At step 106, a past value of the technical indicator for the tradable item is calculated utilizing a product of the first evaluation bar characteristic times the evaluation interval for the predetermined historical period of time. For example, applying the data from steps 101 and 105, a past value of the RSI for gold is calculated every 31 minutes for the past 55 evaluation intervals for the last five years.

At step 107, a present value of the technical indicator for the tradable item is calculated upon an occurrence of the first evaluation bar characteristic during the predetermined historical period of time. For example, applying the data from steps 101 and 105, going back five years, at each 31 minute interval, a present value of the RSI is calculated.

At step 108, a decision is made based upon a relationship between past and present values at each occurrence of the first evaluation bar characteristic for the predetermined historical period of time. For example, with respect to the calculated data from steps 106 and 107, going back five years, at each 31 minute interval, a present value of the RSI is calculated. The present value of the RSI is compared to a past value of the RSI calculated 31 minutes beforehand. If a relationship of present value to past value is one of higher, lower or no change, a corresponding trading decision such as buy, sell or hold is made.

At step 109, a first performance metric and threshold criteria of success with respect to the first performance metric are determined. For example, the first performance metric may be percentage profit, and the threshold criteria of success with respect to the first performance metric may be at least 10% profit.

Performance metrics include without limitation: total profit over 1-year, percentage of profitable trades over a time period, how much was gained or lost in each trade, % of profitable trades in a Bear market or a Bull market, profit factor (total gain>total loss), correlation to other indexes, ratio of profitable trades to cover largest loss etc.

In various embodiments, many conventional and unconventional performance metrics are used. For example, a conventional performance metric is comparing the same time evaluation bar interval on the same market between two or more trading algorithms. For instance, comparing the performance of a first trading algorithm with a 15-minute time evaluation bar characteristic on the S&P 500 with the performance of a second trading algorithm with a 15-minute time evaluation bar characteristic on the S&P 500.

At step 110, if the threshold criteria of success determined at step 109 is satisfied with respect the performance of step 108, a second evaluation bar characteristic is selected. For example, if the performance of step 108 resulted in greater than 10% profit, a second evaluation bar characteristic of every 50 minutes may be selected (employing the selection methodologies described herein).

At step 111, a past value of the technical indicator for the tradable item is calculated utilizing a product of the second evaluation bar characteristic times the evaluation interval. For example, applying the data from step 110, a past value for the RSI for gold is calculated every 50 minutes for the past 55 50 minute intervals (2,750 past values of the RSI for gold are generated).

At step 112, a present value of the technical indicator for the tradable item is calculated upon an occurrence of the second evaluation bar characteristic. For example, applying the data from step 110, a present value for the RSI for gold is calculated every 50 minutes going forward.

At step 113, a decision is made based upon a relationship between the past and present values of the technical indicator at each occurrence of the second evaluation bar characteristic for a predetermined period of time going forward. For example, applying the data from step 110, for a predetermined period of time going forward of the next month, every 50 minutes, a present value of the RSI for gold is calculated. This value is compared to the past value of the RSI calculated 50 minutes prior to the present value calculation. If the relationship of the present value is higher, lower, or has not changed when compared to the past value, a corresponding trading decision such as buy, sell, or hold is made.

At step 114, a predetermined historical period of time is determined. For example, the last ten years can be a predetermined historical period of time.

At step 115, a past value of the technical indicator for the tradable item is calculated utilizing a product of the second evaluation bar characteristic times the evaluation interval for the predetermined historical period of time. For example, applying the data from steps 110 and 114, a past value of the RSI for gold is calculated every 50 minutes for the past 55 evaluation intervals for the last ten years.

At step 116, a present value of the technical indicator for the tradable item is calculated upon an occurrence of the second evaluation bar characteristic during the predetermined historical period of time. For example, applying the data from steps 110 and 114, going back ten years, at each 50 minute interval, a present value of the RSI is calculated.

At step 117, a second tradable item is selected. For example, the price of oil is selected.

At step 118, a third evaluation bar characteristic is selected. For example, every minute may be selected as the third evaluation bar characteristic.

At step 119, a past value of the technical indicator for the second tradable item is calculated utilizing a product of the third evaluation bar characteristic times the evaluation interval. For example, applying the data from steps 117 and 118, a past value for the RSI for oil is calculated every minute for the past 55 one minute intervals (55 past values of the RSI are generated).

At step 120, a present value of the technical indicator for the second tradable item is calculated upon an occurrence of the third evaluation bar characteristic. For example, applying the data from steps 117 and 118, a present value for the RSI for oil is calculated every minute going forward.

At step 121, a decision is made based upon a relationship between the past and present values of the technical indicator at each occurrence of the third evaluation bar characteristic for a predetermined period of time going forward. For example, applying the data from steps 117 and 118, for a predetermined period of time going forward of the next six months, every minute, a present value of the RSI for oil is calculated. This value will be compared to the past value of the RSI for oil calculated 1 minute prior to the present value calculation. If the relationship of the present value is higher, lower or has not changed with respect to the past value, a corresponding trading decision such as buy, sell, or hold will be made.

At step 122, a predetermined historical period of time is determined. For example, the last twenty years can be a predetermined historical period of time.

At step 123, a past value of the technical indicator for the second tradable item is calculated utilizing a product of the third evaluation bar characteristic times the evaluation interval for the predetermined historical period of time. For example, applying the data from steps 117, 118 and 122, a past value of the RSI for oil is calculated every minute for the past 55 evaluation intervals for the last twenty years.

At step 124, a present value of the technical indicator for the second tradable item is calculated upon an occurrence of the third evaluation bar characteristic during the predetermined historical period of time. For example, applying the data from steps 117, 118 and 122, going back twenty years, at each minute interval, a present value of the RSI for oil is calculated.

At step 125, a second performance metric is determined. For example, the second performance metric may be percentage loss.

At step 126, the performance of the technical indicator for the second tradable item for the third evaluation bar characteristic is ranked relative to other technical indicators for the same/differing tradable items for the same/differing evaluation bar characteristics based upon the second performance metric. Each technical indicator, associated tradable item, evaluation bar characteristic, and evaluation interval may be referred to as a trading algorithm. For example, the trading algorithm of the RSI for the price of oil with the third evaluation bar characteristic of every 1 minute for 55 evaluation intervals may be ranked based on percentage loss against the trading algorithm of the Money Flow Index technical indicator for the price of beef every 27 minutes for 55 evaluation intervals.

At step 127, the trading algorithms achieving a predetermined threshold with respect to the second performance metric are selected. For example, those trading algorithms with less than a two percent loss are selected.

According to further embodiments, any trading algorithms that match selected criteria are automatically saved. For example, applying 10,000,000 trading algorithms to market data and comparing the results determines the ranking of the algorithms with the highest % return, lowest drawdown, highest profit factor, etc. The trading algorithms that meet the minimum standards are stored in a database and/or a data warehouse and are the selected trading algorithms, and the ones that do not meet minimum standards are filtered out. For example, 1,000,000 of the aforementioned Ser. No. 10/000,000 trading algorithms have greater than 50% returns, these 1,000,000 trading algorithms are selected trading algorithms and are stored in a data warehouse.

In some embodiments, minimum standards refer to anything that is trade worthy. Minimum standards vary for different preliminary tests. For example, if the strategy is to look for safe trading algorithms, filtering criteria focus on safety (minimal losses) in unfavorable market conditions such as volatile or bearish market periods. If the strategy is to look for high performing trading algorithms, filtering criteria focus on superior returns such as any trading algorithm with a high annual return (i.e., greater than 50% return).

Based on further exemplary systems and methods, massive sets of combined technical indicators, evaluation intervals, tradable items, and evaluation bar characteristics may be generated (sometimes randomly) in bulk with varying combinations of each. The calculations described herein may be performed quickly across numerous computing devices.

Technical indicators may include anything that indicate whether to buy or sell a tradable item based on activity. The activity may include any of price activity, volume activity, time activity, market activity, economic activity, or weather activity. Tradable items may include any of an index, a stock, a bond, a commodity, a sports score, an article of real estate, or another asset. Decisions supported and/or executed by the exemplary systems and methods described herein may include any of buying, selling, selling short, and/or buying to cover.

One of ordinary skill in the art will understand that trade data and/or the raw trade data is big data because of the large number of variables. For example, millions or more of trading algorithms on every electronically traded market, multiplied by thousands of trades per algorithm and multitudes of evaluation metrics, is a massive amount of data. This massive amount of data is tracked in real-time and is continuously updated. Thus, data analysis on this scale is "Big Data Trading" because the data is too diverse, fast-changing, and massive for conventional technologies to address effectively.

According to further exemplary embodiments, the methods described herein may be performed across multiple computation devices for quicker throughput. For example, the aforementioned 1,000,000 selected trading algorithms are scaled across multiple different machines for data processing. For instance, a cloud manger may run the methods described herein on multiple computer processors simultaneously, thereby boosting throughput to achieve more records in less time. In some instances, the amount of processing depends upon situational time constraints. For example, when the methods described herein need to be performed quickly, virtual machines are rented from commercial data centers to increase throughput, and the desired work is divided into smaller units. For instance, 1,000,000 selected trading algorithms may be subdivided into five units of 200,000 trading algorithms. Each smaller unit of 200,000 algorithms is assigned to a virtual machine or a group of virtual machines that are turned on when needed and turned off when finished.

Figure 2:
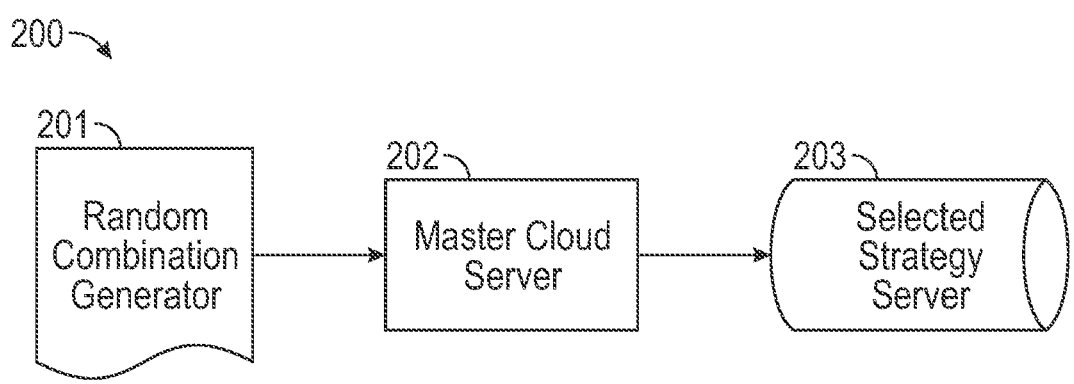
FIG. 2 shows an exemplary system architecture for a secure intelligent networked system.

FIG. 2 shows an exemplary system architecture 200 for a secure intelligent networked system. Exemplary system architecture 200 includes random combination generator 201, master cloud server 202 and selected strategy server 203.

According to some exemplary embodiments, random combination generator 201 is hardware for the random selection of indicators, evaluation intervals, tradable items, bar definitions, and/or other parameters. This hardware is also responsible for the random combination(s) of such parameters.

Master cloud server 202, according to various exemplary embodiments comprises a master virtual machine server. According to various exemplary embodiments, a virtual machine may comprise an emulation of a particular computer system. Virtual machines operate based on the computer architecture and functions of a real or hypothetical computer, and their implementations may involve specialized hardware, software, or a combination of both.

In certain exemplary embodiments, a master virtual machine server may comprise a single server responsible for generating all of or most of the virtual machines.

For example, a cloud manager may be a custom application that manages trading strategies or algorithms. The cloud manager is configured to the cluster of cloud computing instances for processing large amounts of data. The cloud manager serves as the user interface to handle the ordering and cancelling of virtual computing instances. Additionally, the cloud manager may allow for detailed customization of the virtual machines. For example, Random Access Memory ("RAM"), processor speed, number of processors, network details, security/encryption, and/or memory may be detailed for each virtual machine and/or all virtual machines. Once the cluster of cloud computing instances is ordered and running, the cloud manager is "listening" for idle machines and "assigning" any idle machine a trading strategy for analyzing.

A cloud-based computing environment is a resource that typically combines the computational power of a large grouping of processors and/or that combines the storage capacity of a large grouping of computer memories or storage devices. For example, systems that provide a cloud resource may be utilized exclusively by their owners; or such systems may be accessible to outside users who deploy applications within the computing infrastructure to obtain the benefit of large computational or storage resources.

For example, from a $3^{rd}$ party cloud provider, an order is placed to create virtual machine (vm) based of an image of a stored template vm with required specifications and name it "VM1."

Selected strategy server 203 according to some exemplary embodiments may comprise trading algorithms, trading strategies or "bots" that meet minimum standards as stored in a database and/or in a data warehouse.

Figure 3:
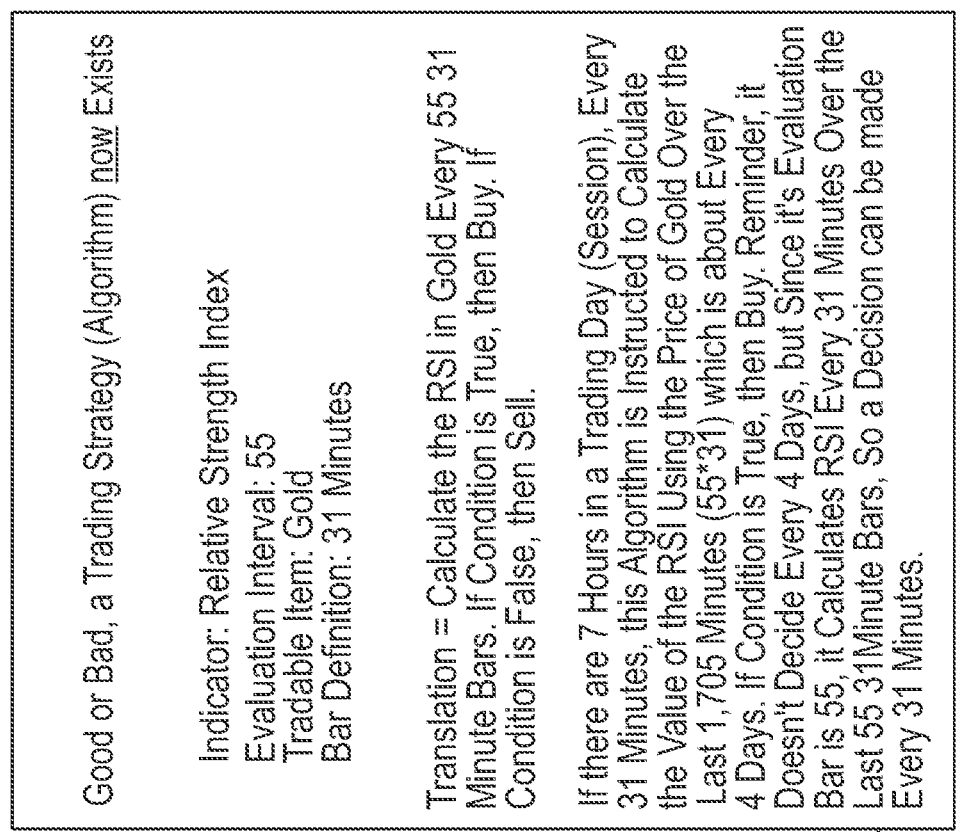
FIG. 3 is another flowchart of an exemplary method for a secure intelligent networked system.
Figure 3:
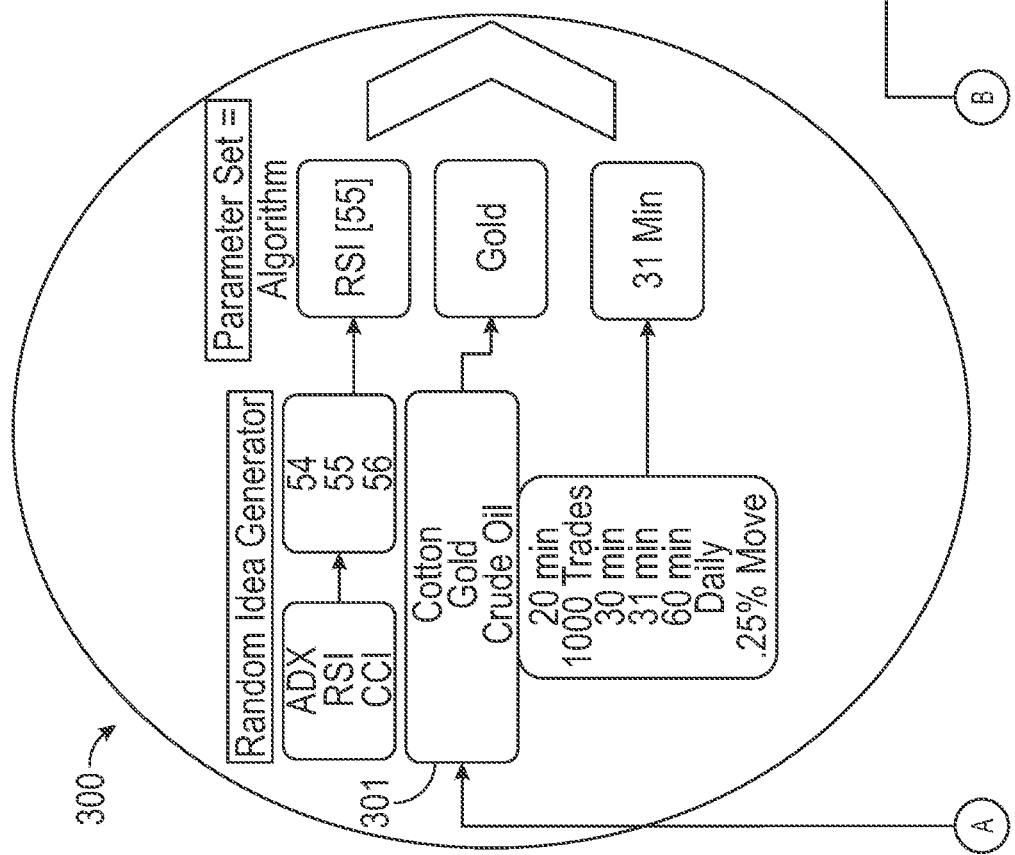
Figure 3:
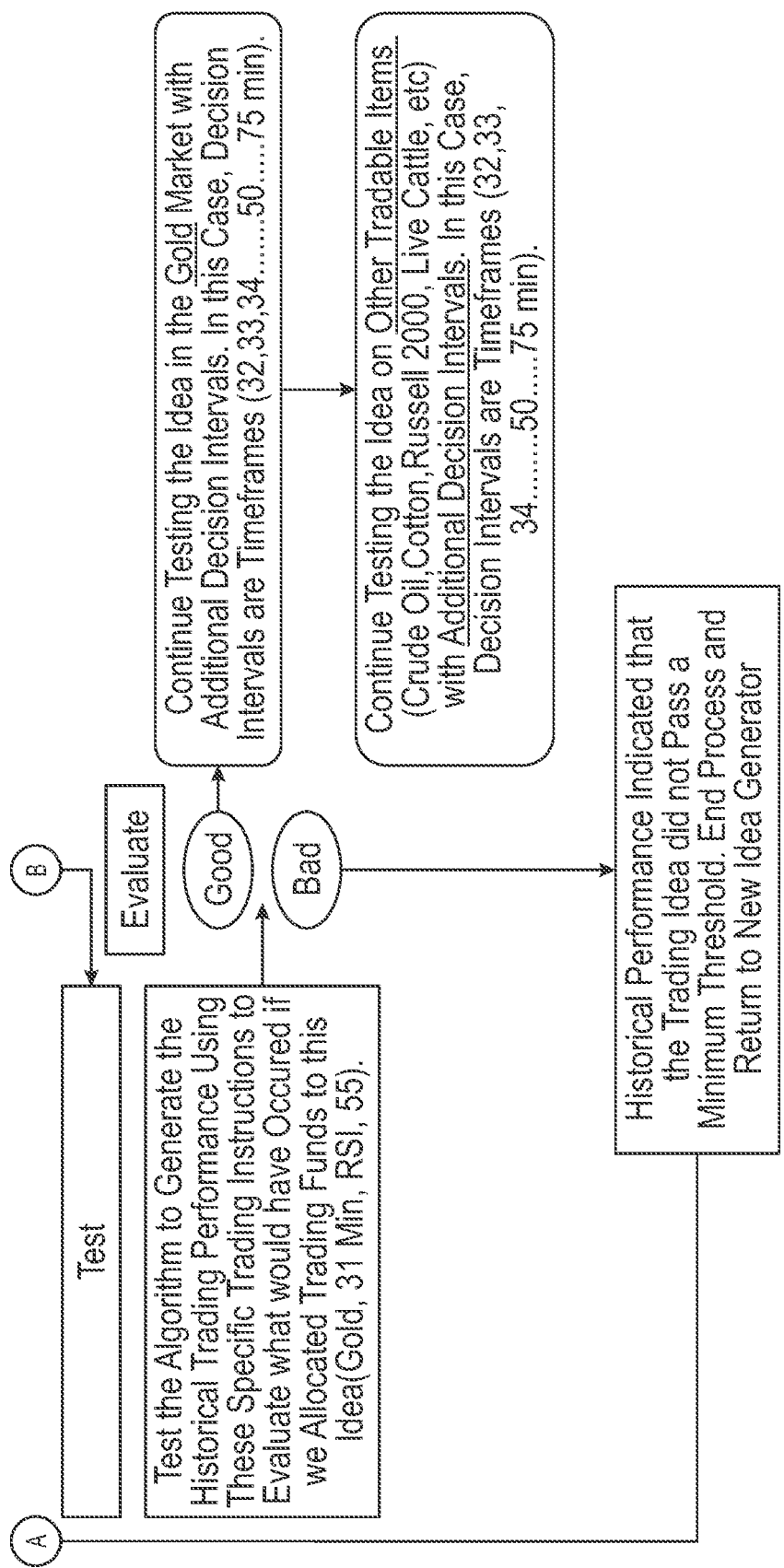

FIG. 3 is another flowchart of an exemplary method 300 for a secure intelligent networked system.

Within circle 301, according to some exemplary embodiments, shows steps under the direction of the random combination generator, such as random combination generator 201 (FIG. 2) for the random selection of indicators, evaluation intervals, tradable items, bar definitions, and/or other parameters. This generator is also responsible for the random combination(s) of such parameters.

Outside of circle 301, according to some exemplary embodiments, shows steps under the direction of the master cloud server, such as master cloud server 202 (FIG. 2).

Figure 4:
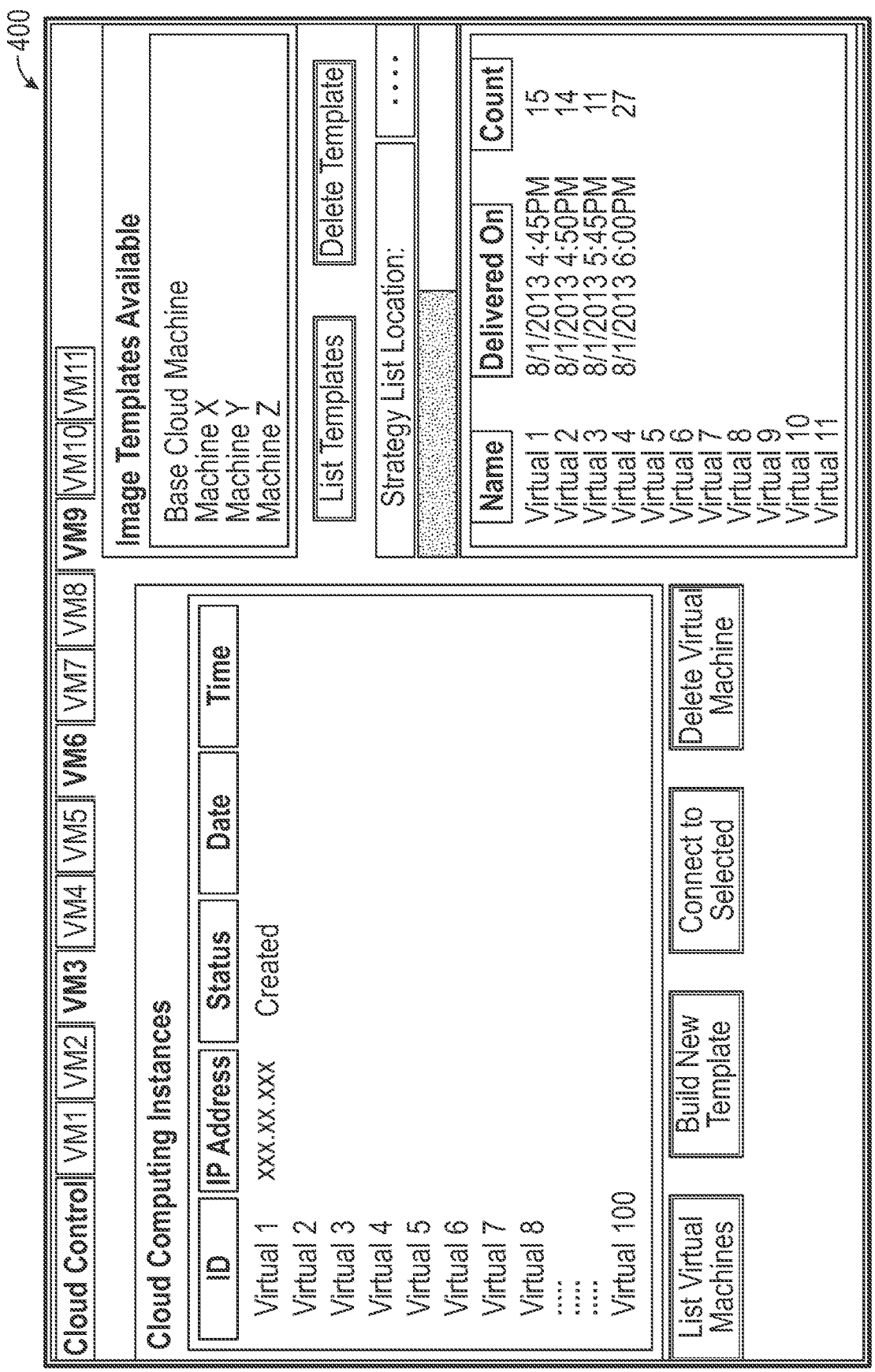
FIG. 4 shows an exemplary interactive graphical user interface for directing operation of the master cloud server.

FIG. 4 shows an exemplary interactive graphical user interface 400 for directing operation of the master cloud server, such as master cloud server 202 (FIG. 2).

According to some exemplary embodiments, the exemplary interactive graphical user interface 400 is responsible for generating and selecting trading strategies, algorithms and/or bots. The exemplary interactive graphical user interface 400 is configured to the cluster of cloud computing instances for processing large amounts of data. The exemplary interactive graphical user interface 400 is the interface to handle the ordering and cancelling of virtual computing instances. Additionally, it may allow for detailed customization of the virtual machines. For example, Random Access Memory ("RAM"), processor speed, number of processors, network details, security/encryption, and/or memory may be detailed for each virtual machine and/or all virtual machines. Once the cluster of cloud computing instances is ordered and running, the exemplary interactive graphical user interface 400 through the master cloud server is "listening" for idle machines and "assigning" any idle machine a trading strategy for analyzing.

The exemplary systems and methods described herein may be performed in a secure computing environment including the use of firewalls and encryption technology. Given the potentially high value of the information being generated, and the potential magnitude of the resulting investment decisions, measures may be taken to perform some or all of the steps herein in a secure manner, with emphasis on such steps as the determination of strategy and execution of trades. For example, in addition to an optimal strategy, non-optimal strategies may purposely be added in the same string or digital data environment of the optimal strategy to confuse any unwanted hackers intercepting such information. As another example, in addition to a desired trade to be executed, undesired trades may purposely be added in the same string or digital data environment of the desired trade to confuse any unwanted hackers intercepting such information. Further, the desired trade may receive funding for execution, whereas the undesired trades may not receiving funding for execution.

While various embodiments have been described above, it should be understood that they have been presented by way of example only, and not limitation. The descriptions are not intended to limit the scope of the technology to the particular forms set forth herein. Thus, the breadth and scope of a preferred embodiment should not be limited by any of the above-described exemplary embodiments. It should be understood that the above description is illustrative and not restrictive. To the contrary, the present descriptions are intended to cover such alternatives, modifications, and equivalents as may be included within the spirit and scope of the technology as defined by the appended claims and otherwise appreciated by one of ordinary skill in the art. The scope of the technology should, therefore, be determined not with reference to the above description, but instead should be determined with reference to the appended claims along with their full scope of equivalents.

What is claimed is:

1. A secure intelligent networked system comprising:
    a hardware random combination generator;
    a master cloud server communicatively coupled to the random combination generator, the master cloud server having an interactive graphical user interface configured to receive user commands for generating a plurality of virtual machines, one or more of the plurality of virtual machines creating a neural network base, the neural network base trained by the one or more of the plurality of virtual machines to improve an ability of a neural network to generalize outputs and responses through use of noisy data, including small random variations from previously learned solutions to determine that a particular trading strategy should be employed during a next trading period, each of the plurality of virtual machines being configured to process trading strategies, the master cloud server automatically identifying an idle virtual machine in the plurality of virtual machines and automatically utilizing the idle virtual machine; and
    the idle virtual machine communicatively coupled to the master cloud server, the master cloud server automatically generating trading strategies which comprise an intentionally false first digital data element interspersed with a first digital data element and automatically transmitting the trading strategies to the idle virtual machine, the intentionally false first digital data element representing a non-optimal strategy and representing a technical solution to a technical problem of enhancing security of the trading strategies executed within the plurality of virtual machines, a presence of the intentionally false first digital data element of the trading strategies being used to confuse a party that intercepts the trading strategies.

2. The secure intelligent networked system of claim 1, further comprising the random combination generator:
    randomly selecting the first digital data element;
    randomly selecting an evaluation interval;
    randomly selecting a second digital data element; and
    randomly selecting a first evaluation bar characteristic.

3. The secure intelligent networked system of claim 2, further comprising the plurality of virtual machines:
    calculating a past value of the first digital data element for the second digital data element utilizing a product of the first evaluation bar characteristic times the evaluation interval;
    calculating a present value of the first digital data element for the second digital data element upon an occurrence of the first evaluation bar characteristic;
    making a decision based upon a relationship between past and present values at each occurrence of the first evaluation bar characteristic for a predetermined period of time going forward;
    determining a predetermined historical period of time;
    calculating a past value of the first digital data element for the second digital data element utilizing a product of the first evaluation bar characteristic times the evaluation interval for the predetermined historical period of time;
    calculating a present value of the first digital data element for the second digital data element upon an occurrence of the first evaluation bar characteristic during the predetermined historical period of time;
    making a decision based upon a relationship between past and present values at each occurrence of the first evaluation bar characteristic for the predetermined historical period of time;
    determining a first performance metric and a threshold criteria of success with respect to the first performance metric;
    if the threshold criteria of success is satisfied,
    selecting a second evaluation bar characteristic;
    calculating a past value of the first digital data element for the second digital data element utilizing a product of the second evaluation bar characteristic times the evaluation interval;
    calculating a present value of the first digital data element for the second digital data element upon an occurrence of the second evaluation bar characteristic;
    making a decision based upon a relationship between past and present values at each occurrence of the second evaluation bar characteristic for a predetermined period of time going forward;
    determining a predetermined historical period of time;
    calculating a past value of the first digital data element for a tradable item utilizing a product of the second evaluation bar characteristic times the evaluation interval for the predetermined historical period of time;
    calculating a present value of the first digital data element for the second digital data element upon an occurrence of the second evaluation bar characteristic during the predetermined historical period of time;
    selecting a third evaluation bar characteristic;
    calculating a past value of the first digital data element for the second digital data element utilizing a product of the third evaluation bar characteristic times the evaluation interval;
    calculating a present value of the first digital data element for the second digital data element upon an occurrence of the third evaluation bar characteristic;
    making a decision based upon a relationship between past and present values at each occurrence of the third evaluation bar characteristic for a predetermined period of time going forward;
    determining a second predetermined historical period of time;
    calculating a past value of the first digital data element for the second digital data element utilizing a product of the third evaluation bar characteristic times the evaluation interval for the second predetermined historical period of time;
    calculating a present value of the first digital data element for the second digital data element upon an occurrence of the third evaluation bar characteristic during the second predetermined historical period of time;
    determining a second performance metric;
    ranking performance of the first digital data element relative to other similarly ranked first digital data elements; and
    selecting the first digital data elements achieving a predetermined threshold with respect to the second performance metric.

4. A secure intelligent networked system comprising:
    a hardware random combination generator;
    a master cloud server communicatively coupled to the random combination generator, the master cloud server having an interactive graphical user interface configured to receive user commands for generating a plurality of virtual machines that are capable of processing trading strategies, one or more of the plurality of virtual machines creating a neural network base, the neural network base trained by the one or more of the plurality of virtual machines to improve an ability of a neural network to generalize outputs and responses through use of noisy data, including small random variations from previously learned solutions to determine that a particular trading strategy should be employed during a next trading period, the master cloud server automatically identifying an idle virtual machine in the plurality of virtual machines and automatically utilizing the idle virtual machine to process at least a portion of the trading strategies; and
    the master cloud server automatically generating the at least a portion of the trading strategies which comprise a string of transactions or a digital data environment that comprises a first digital data element and an intentionally false first digital data element integrated together, and transmitting the at least a portion of the trading strategies to the idle virtual machine, wherein a presence of the intentionally false first digital data element is intended to confuse a party who intercepts the at least a portion of the trading strategies.

5. The secure intelligent networked system of claim 4, further comprising the plurality of virtual machines:
    calculating a past value of the first digital data element for a second digital data element utilizing a product of a first evaluation bar characteristic times an evaluation interval; and
    calculating a present value of the first digital data element for the second digital data element upon an occurrence of the first evaluation bar characteristic.

6. The secure intelligent networked system of claim 5, further comprising the plurality of virtual machines:

making a decision based upon a relationship between past and present values at each occurrence of the first evaluation bar characteristic for a predetermined period of time going forward; and determining a predetermined historical period of time.

7. The secure intelligent networked system of claim 6, further comprising the plurality of virtual machines:

calculating a past value of the first digital data element for the second digital data element utilizing a product of the first evaluation bar characteristic times the evaluation interval for the predetermined historical period of time; and calculating a present value of the first digital data element for the second digital data element upon an occurrence of the first evaluation bar characteristic during the predetermined historical period of time.

8. The secure intelligent networked system of claim 7, further comprising the plurality of virtual machines:

making a decision based upon a relationship between past and present values at each occurrence of the first evaluation bar characteristic for the predetermined historical period of time; and determining a first performance metric and a threshold criteria of success with respect to the first performance metric.

9. The secure intelligent networked system of claim 8, further comprising the plurality of virtual machines:

if the threshold criteria of success is satisfied, selecting a second evaluation bar characteristic; and calculating a past value of the first digital data element for the second digital data element utilizing a product of the second evaluation bar characteristic times the evaluation interval.

10. The secure intelligent networked system of claim 9, further comprising the plurality of virtual machines:

calculating a present value of the first digital data element for the second digital data element upon an occurrence of the second evaluation bar characteristic; and making a decision based upon a relationship between past and present values at each occurrence of the second evaluation bar characteristic for a predetermined period of time going forward.

11. The secure intelligent networked system of claim 10, further comprising the plurality of virtual machines:

determining a second predetermined historical period of time; and calculating a past value of the first digital data element for a tradable item utilizing a product of the second evaluation bar characteristic times the evaluation interval for the second predetermined historical period of time.

12. The secure intelligent networked system of claim 11, further comprising the plurality of virtual machines:

calculating a present value of the first digital data element for the second digital data element upon an occurrence of the second evaluation bar characteristic during the second predetermined historical period of time; and selecting a third digital data element.

13. The secure intelligent networked system of claim 12, further comprising the plurality of virtual machines:

selecting a third evaluation bar characteristic; and calculating a past value of the first digital data element for the third digital data element utilizing a product of the third evaluation bar characteristic times the evaluation interval.

14. The secure intelligent networked system of claim 13, further comprising the plurality of virtual machines:

calculating a present value of the first digital data element for the third digital data element upon an occurrence of the third evaluation bar characteristic.

15. The secure intelligent networked system of claim 14, further comprising the plurality of virtual machines:

making a decision based upon a relationship between past and present values at each occurrence of the third evaluation bar characteristic for a predetermined period of time going forward.

16. The secure intelligent networked system of claim 15, further comprising the plurality of virtual machines:

determining a third predetermined historical period of time.

17. The secure intelligent networked system of claim 16, further comprising the plurality of virtual machines:

calculating a past value of the first digital data element for the thirdd digital data element utilizing a product of the third evaluation bar characteristic times the evaluation interval for the third predetermined historical period of time.

18. The secure intelligent networked system of claim 17, further comprising the plurality of virtual machines:

calculating a present value of the first digital data element for the third digital data element upon an occurrence of the third evaluation bar characteristic during the third predetermined historical period of time.

19. The secure intelligent networked system of claim 18, further comprising the plurality of virtual machines:

determining a second performance metric.

20. The secure intelligent networked system of claim 19, further comprising the plurality of virtual machines:

ranking performance of the first digital data element relative to other similarly ranked first digital data elements; and selecting the first digital data elements achieving a predetermined threshold with respect to the second performance metric.

* * * * *